United States Patent Office 3,695,834
Patented Oct. 3, 1972

3,695,834
CATION EXCHANGE CONVERSION OF HYDROXYLAMINE SULFATE TO HYDROXYLAMINE NITRATE
Earl J. Wheelwright, Richland, Wash., assignor to the United States of America as represented by the United States Atomic Energy Commission
No Drawing. Filed Oct. 12, 1970, Ser. No. 80,499
Int. Cl. C01b 21/14
U.S. Cl. 423—395                        6 Claims

ABSTRACT OF THE DISCLOSURE

Hydroxylamine sulfate is converted to hydroxylamine nitrate by passing an aqueous hydroxylamine sulfate solution through a cation exchange resin bed which adsorbs the hydroxylamine, washing the sulfate ion from the resin bed and eluting the hydroxylamine as hydroxylamine nitrate with nitric acid.

CONTRACTUAL ORIGIN OF THE INVENTION

The invention described herein was made in the course of, or under, a contract with the United States Atomic Energy Commission.

BACKGROUND OF THE INVENTION

This invention relates to a process for converting hydroxylamine sulfate to hydroxylamine nitrate.

As the number of nuclear reactors increase, methods and techniques for reprocessing the fuel which has been irradiated in these reactors must be improved. It is necessary to speed up fuel reprocessing and to improve recovery of uranium and plutonium to provide fuel for these and other reactors under construction, and for reactors planned for in the future.

A number of methods have been developed to accomplish this fuel reprocessing, such as halide volatility processes, pyrometallurgical processes and solvent extraction processes.

Of these processes, the solvent extraction process utilizing tributyl phosphate in a kerosene base is currently in large-scale use. This process is generally referred to as the Purex Process and is described in detail in "Reactor Handbook," Second edition, vol. II, "Fuel Reprocessing," Stoller and Richards, Interscience, 1961. This process relies upon the extractability of uranyl nitrate and the relative inextractability of plutonium (III) to separate these two elements. Because the plutonium is normally in the +4 state, it must be reduced in order to effect the separation.

One method for effecting this plutonium reduction is the addition of ferrous sulfamate to the organic phase containing the uranium and plutonium. However, the addition of the above compound leads to several problems. The iron remains in the radioactive waste and its presence accelerates corrosion of the waste concentration equipment. The iron also complicates treatment of the waste for by-product recovery, which is now becoming very important, and the additional compounds in the waste add to the total quantity of radioactive material which must be stored in underground tanks or other expensive storage facilities, thus adding to the total process cost.

A reductant which eliminates many of these problems is hydroxylamine, available as either the sulfate or the nitrate. The most economical form is hydroxylamine sulfate; however, the presence of the sulfate ion causes high waste losses and severe plugging of product concentrators, making it unsatisfactory to use. Hydroxylamine nitrate causes no such problems; however, the cost of the nitrate is several times that of the sulfate, thus adding substantially to the total process cost.

SUMMARY OF THE INVENTION

I have developed a process for converting hydroxylamine sulfate to hydroxylamine nitrate which is simple, inexpensive and which can be accomplished with readily available process equipment. By my process an aqueous solution of hydroxylamine sulfate is passed through a cation exchange resin bed which adsorbs the hydroxylamine. The nonadsorbable sulfate ion is then washed from the resin bed and the hydroxylamine is eluted as hydroxylamine nitrate with nitric acid.

It is therefore one object of this invention to provide an economical process for making hydroxylamine nitrate.

It is another object of this invention to provide a process for converting hydroxylamine sulfate to hydroxylamine nitrate.

Finally, it is the object of this invention to provide a process for converting hydroxylamine sulfate to hydroxylamine nitrate that is economical and which can make use of conventional process equipment.

DETAILED DESCRIPTION OF THE PREFERRED EMBODIMENT

These and other objects may be met by passing a 1 M aqueous solution of hydroxylamine sulfate through a strongly acidic cation exchange resin bed whereby the hydroxylamine is adsorbed on the resin bed, passing water through the bed as a wash to remove the nonadsorbable sulfate ion and any unadsorbed hydroxylamine from the bed and thereafter passing an aqueous solution of 2 M nitric acid through the bed to elute the hydroxylamine as hydroxylamine nitrate.

The concentration of the aqueous hydroxylamine sulfate feed solution is not important; however, a 1 M solution was found to be most convenient to fully load the resin bed with a minimum of effort.

Distilled water is used as a wash to remove the nonadsorbable sulfate ion from the resin bed and also to remove any unadsorbed hydroxylamine which may be trapped within the bed. The bed should be washed until all the sulfate ion has been removed therefrom to prevent contamination of the final product.

The aqueous nitric acid eluant may vary from 1 to 3.0 M, with a 2 M concentration preferred. Concentrations of acid below 2 M will increase the volume of fluid necessary to effect total elution of the hydroxylamine and result in low hydroxylamine nitrate concentration in the final product. Acid concentrations greater than 3.0 M must be avoided, particularly at higher operating temperatures, as they will decompose the hydroxylamine, generating a gas which may result in disruption of the resin bed.

Any strongly acidic cation exchange resins are suitable for the process of this invention. A resin commercially available under the name of Dowex 50W cross-linked to 80% was used for the investigations of the process of this invention. Dowex 50W is made according to Example I of U.S. Pat. No. 2,366,007, granted to D'Alelio on Dec. 26, 1944. The particles size of the resin may vary from between 20 and 100 mesh with good results. For the loading of the hydroxylamine the resin is used in the H+ cycle.

Ambient temperature is preferred for the process of this invention, although temperatures of from 10 to 40° C. will give satisfactory results. Higher temperatures may result in gas formation due to decomposition of the hydroxylamine and cause column pressurization.

Flow rates through the resin bed of from 6 to 8 ml./min.-cm.$^2$ were determined to give optimum results, although flows up to 10 ml./min.-cm.$^2$ were satisfactory. In the washing step faster flow rates may require more water to completely remove the sulfate ion, and in the elution step would lower the concentration of the final product.

The following example is given as illustrative of the process of this invention and is not to be taken as limiting the scope or extent of the invention.

Example

An number of conversion runs were made using a 1-inch internal diameter Pyrex glass piper column filled with Dowex 50W, X–8 resin to a depth of 172 cm. The resin mesh size varied. The primary glass column was contained within a second glass pipe and water circulated through the annular space to vary and maintain resin bed temperature. Runs 1–3 were made at 10° C. ±2, although it was later determined that ambient temperature was satisfactory. Run 7 was operated at 40° C. the conditions and results of these runs are given in the table below.

CATION EXCHANGE CONVERSION OF HYDROXYLAMINE SULFATE TO NITRATE

| Number | 1 | 2 | 3 | 4 | 5 | 6 | 7 |
|---|---|---|---|---|---|---|---|
| Resin bed: | | | | | | | |
| Mesh size (Dowex 50W, X–8) | 50–100 | 50–100 | 20–50 | 20–50 | 20–50 | 20–50 | 20–50 |
| Bed volume (ml.) | 870 | 870 | 810 | 810 | 810 | 810 | 810 |
| Bed operating temperature (° C.) | 10 | 10 | 10 | 10 | 10 | 10 | 40 |
| Feed solution (HS): | | | | | | | |
| Volume (ml.) | 3,000 | 2,000 | 2,000 | 2,000 | 2,000 | 2,000 | 2,000 |
| Molar concentration | 0.5 | 1.0 | 1.0 | 1.0 | 1.0 | 1.0 | 1.0 |
| Flow rate (ml./min.-cm.$^2$) | 4.0 | 8.0 | 3.8 | 5.7 | 7.8 | 9.7 | 8.0 |
| Water wash solution: | | | | | | | |
| Volume (ml.) | 1,000 | 1,000 | 2,000 | 2,000 | 2,000 | 2,000 | 2,000 |
| Flow rate (ml./min.-cm.$^2$) | 4.0 | 8.0 | 3.8 | 5.7 | 7.8 | 9.7 | 8.0 |
| Eluting solution: | | | | | | | |
| Volume (ml.) | 1,700 | 1,900 | 1,900 | 1,950 | 2,100 | 2,150 | 1,760 |
| Molar concentration HNO$_3$ | 2.0 | 2.0 | 2.0 | 2.0 | 2.0 | 2.0 | 2.0 |
| Flow rate (ml./min.-cm.$^2$) | 4.0 | 8.0 | 3.8 | 5.7 | 7.8 | 9.7 | 8.0 |
| Total eluted product: | | | | | | | |
| Moles NH$_2$OH | 1.64 | 1.64 | 1.47 | 1.48 | 1.52 | 1.59 | 1.47 |
| Volume (ml.) | 1,400 | 1,500 | 1,600 | 1,650 | 1,800 | 1,850 | 1,460 |
| NH$_2$OH conc. (M) | 1.17 | 1.09 | 0.92 | 0.89 | 0.84 | 0.81 | 1.01 |
| Excess acid (M) | 0.74 | 0.80 | 0.97 | 0.94 | 1.03 | 1.08 | 0.81 |
| Total resin capacity (moles per liter) | 1.89 | 1.89 | 1.82 | 1.84 | 1.88 | 1.84 | 1.82 |
| Eluted product minus recycle: | | | | | | | |
| Moles NH$_2$OH | 1.62 | 1.60 | 1.44 | 1.44 | 1.47 | 1.45 | 1.44 |
| Volume (ml.) | 1,100 | 1,100 | 1,140 | 1,200 | 1,300 | 1,300 | 1,200 |
| NH$_2$OH conc. (M) | 1.47 | 1.45 | 1.26 | 1.20 | 1.13 | 1.12 | 1.20 |
| Excess acid (M) | 0.57 | 0.54 | 0.57 | 0.58 | 0.68 | 0.71 | 0.57 |
| Percent NH$_2$OH recycled | 1.2 | 2.4 | 2.0 | 2.7 | 3.3 | 2.7 | 2.0 |

It can readily be seen from the above results that the process of this invention provides a convenient and economical method for converting hydroxylamine sulfate to hydroxylamine nitrate.

It will be understood that the invention is not to be limited to the details given herein but that it may be modified within the scope of the appended claims.

The embodiments of the invention in which an exclusive property or privilege is claimed are defined as follows:

1. Process for making a hydroxylamine nitrate comprising: passing an aqueous feed solution of hydroxylamine sulfate over a strongly acidic cation exchange resin bed whereby the hydroxylamine is adsorbed on the resin, passing water through said bed, thereby washing the remaining sulfate ion from said bed, and passing an aqueous nitric acid solution through said bed, thereby eluting the hydroxylamine as hydroxylamine nitrate.

2. The method of claim 1 wherein the feed solution is 1 M in hydroxylamine sulfate.

3. The method of claim 2 wherein the nitric acid concentration is 1 to 3.0 M.

4. The method of claim 3 wherein the process temperature is 10 to 40° C.

5. The method of claim 4 wherein the flow rate of the solution is through the resin bed at 6–10 ml./min-cm.$^2$.

6. A method of converting hydroxylamine sulfate to hydroylamine nitrate comprising: passing an aqueous feed solution of 1 M hydroxylamine sulfate over a strongly acidic cation exchange resin bed at ambient temperature and at a solution flow rate of 8–10 ml./min.-cm.$^2$ whereby the hydroxylamine is adsorbed on the resin bed, passing sufficient water over said resin bed to wash the remaining sulfate ion from the resin bed, and passing an aqueous 2 M nitric acid solution through said bed at ambient temperature and at a solution flow rate of 8–10 ml./min.-cm.$^2$, thereby eluting hydroxylamine as hydroxylamine nitrate.

References Cited

UNITED STATES PATENTS

| 2,631,127 | 3/1953 | D'Alelio | 210—38 X |
| 3,105,741 | 10/1963 | Moore et al. | 23—190 A |
| 3,475,330 | 10/1969 | Gilles | 210—38 |
| 2,307,929 | 1/1943 | Joyce | 23—190 A |

OTHER REFERENCES

"Ion Exchange Technology," edited by Nachoo et al.; Academic Press; New York, 1956.

EARL C. THOMAS, Primary Examiner

G. O. PETERS, Assistant Examiner